US008095670B2

(12) United States Patent
Brown et al.

(10) Patent No.: US 8,095,670 B2
(45) Date of Patent: Jan. 10, 2012

(54) PROTOCOL FOR ENABLING DYNAMIC AND SCALABLE FEDERATION OF ENTERPRISE SERVICE BUSES

(75) Inventors: Kyle G. Brown, Apex, NC (US); Robert D. Callaway, Holly Springs, NC (US); Richard A. Robinson, Birmingham (GB); Adolfo F. Rodriguez, Raleigh, NC (US); Ioannis Viniotis, Cary, NC (US)

(73) Assignee: International Business Machines, Armonk, NY (US)

( * ) Notice: Subject to any disclaimer, the term of this patent is extended or adjusted under 35 U.S.C. 154(b) by 208 days.

(21) Appl. No.: 11/853,236

(22) Filed: Sep. 11, 2007

(65) Prior Publication Data

US 2009/0070456 A1 Mar. 12, 2009

(51) Int. Cl.
*G06F 15/16* (2006.01)
*G06F 15/173* (2006.01)

(52) U.S. Cl. ......................... 709/229; 709/217; 709/238

(58) Field of Classification Search .................. 709/236, 709/230, 238, 219, 217, 229
See application file for complete search history.

(56) References Cited

U.S. PATENT DOCUMENTS

| | | | | |
|---|---|---|---|---|
| 6,744,877 | B1 * | 6/2004 | Edwards | 379/265.02 |
| 7,353,295 | B1 * | 4/2008 | Crow et al. | 709/245 |
| 2008/0069124 | A1 * | 3/2008 | Patrick | 370/401 |
| 2008/0140857 | A1 * | 6/2008 | Conner et al. | 709/236 |
| 2008/0183479 | A1 * | 7/2008 | Iwashita et al. | 705/1 |
| 2008/0299947 | A1 * | 12/2008 | Litttle | 455/412.1 |
| 2009/0006167 | A1 * | 1/2009 | Toussaint et al. | 705/8 |
| 2009/0055888 | A1 * | 2/2009 | Little | 726/1 |
| 2009/0319686 | A1 * | 12/2009 | Watanabe | 709/240 |

OTHER PUBLICATIONS

J. Moy, OSPF Version 2, Ascend Communications, Inc., Apr. 1998.
Keen et al. “Patterns: Integrating Enterprise Service Buses in a Service-Oriented Architecture,” IBM Redbooks, (Nov. 2005), 352 pages.
Nott et al. “Choose an ESB Topology to Fit Your Business Model,” IBM DeveloperWorks, (Mar. 2006), available at http://www.ibm.com/developerworks/library/ws-soa-esbtop/, 14 pages, last accessed Sep. 23, 2010.

* cited by examiner

*Primary Examiner* — Kristie Shingles
(74) *Attorney, Agent, or Firm* — Jeffrey T. Holman

(57) ABSTRACT

In a method and system for creating a federation of a plurality of enterprise service buses (ESBs), a plurality of ESB nodes provide connectivity to one or more services. According to a protocol, at least a portion of the ESB nodes transmit policy-based service advertisement messages to other ESB nodes, wherein the policy-based service advertisement messages include service state information. In response to receiving the policy-based service advertisement messages, each of the ESB nodes stores the service state information received from other ESB nodes in respective distributed registries to create a local view of routable service endpoints in the federation. Each of the ESB nodes then uses its respective distributed registry to make routing decisions when routing service requests.

18 Claims, 8 Drawing Sheets

PROTOCOL FOR ENABLING DYNAMIC AND SCALABLE FEDERATION OF ENTERPRISE SERVICE BUSES

RELATED APPLICATIONS

The present invention is related to application Ser. No. 11/854,940 entitled PROTOCOL FOR ENABLING DYNAMIC AND HIERARCHICAL INTERCONNECTION OF AUTONOMOUS FEDERATIONS OF ENTERPRISE SERVICE BUSES (RSW920070128US1) filed on Sep. 13, 2007.

BACKGROUND OF THE INVENTION

In computing, an enterprise service bus serves as the integration platform within service-oriented architectures. The enterprise service bus (ESB) refers to an abstraction layer on top of an implementation of an enterprise messaging system that attempts to remove the coupling between the messaging service called and the transport medium. The ESB may be implemented as software or as a hardware device. The ESB is responsible for, along with many other functions, enforcement of policies, routing of service requests, and performing content and/or transport protocol transformation. There are numerous technical and business issues which affect the choice of topology for the deployment of ESBs.

It is often desirable to have multiple ESB deployments federate with one another to provide a distributed integration platform that promotes the reuse of services within the enterprise. The term federation refers to a group of two or more ESB deployments that share at least some routing state. The goal of federation is to provide a logically centralized (at an appropriate scope) integration infrastructure across different geographic and business boundaries. Assuming that one or more services have already been manually deployed and hosted through an ESB, there are three known solutions to federate ESB deployments together to support reuse of services throughout an enterprise: manual configuration, utilizing a broker ESB, or deploying a centralized service registry.

One way of federating ESBs is by manually configuring functionality within an ESB that serves as a "proxy" to other ESBs in the federation. For each service that is managed by a remote ESB, a mediation on the ESB must be defined that selects appropriate requests to be forwarded to the remote ESB, performs necessary content/protocol transformations, and then forwards the request onto the remote ESB. Matching mediations must exist on remote ESBs in order to support bidirectional communication in this case. Since this configuration must be done manually by a systems administrator at each ESB, the configuration of such a solution is tedious and prone to error (for S services and N ESBs, there are possibly SN proxies to be configured). There is also no mechanism to change the properties of this mediation based on changes in network or service availability. Manual configuration allows basic federation of multiple ESBs; however, this is an inflexible and impractical solution for large scale enterprises.

Rather than statically defining the routing mediations at each ESB, a separate ESB called a "broker" ESB can be deployed whose sole function is to implement the requisite mediations to support the federation. This helps to consolidate the many different mediations that might exist in the manually configured solution described above into a single ESB. However, this consolidation is still dependent on a systems administrator to manually define the mediations required for each service (in this case, the number of proxies to be configured is minimized to S). Since there is no mechanism to update the mediation metadata based on dynamic service availability, the broker ESB solution is inflexible. The broker ESB then becomes the architectural bottleneck, which introduces issues with scalability and fault tolerance.

The final known approach is to deploy a centralized registry for the entire enterprise. When ESBs need to route service requests to other ESBs, the ESBs consult a central registry at runtime to make a forwarding decision based on the current location of a service instance, thus addressing the manual configuration concerns raised by the previous solutions (as with the broker ESB, the number of entries in the centralized registry is equal to the number of services). However, centralizing all service metadata and status into a single registry forces the registry to be the architectural bottleneck in such a federated system, causing concerns with system performance, scalability, and fault tolerance. The centralized registry is ideal from the standpoint of the consolidation of service information, but is infeasible in many realistic business scenarios due to B2B interactions, disparate geographical locations, and limitations imposed by business structures. Today, manual configuration of the centralized registry is required to insert/update/delete service metadata, which limits the flexibility of this solution.

In summary, the existing approaches to federating ESBs require tedious manual configuration, which is prone to errors and inflexible to dynamic IT environments. The broker ESB and centralized registry approaches require the consolidation of service metadata into a centralized location, which causes concerns with scalability and reliability of the integration infrastructure.

BRIEF SUMMARY OF THE INVENTION

In a method and system for creating a federation of a plurality of enterprise service buses (ESBs), a plurality of ESB nodes provide connectivity to one or more services. According to a protocol, at least a portion of the ESB nodes transmit policy-based service advertisement messages to other ESB nodes, wherein the policy-based service advertisement messages include service state information. In response to receiving the policy-based service advertisement messages, each of the ESB nodes stores the service state information received from other ESB nodes in respective distributed registries to create a local view of routable service endpoints in the federation. Each of the ESB nodes then uses its respective distributed registry to make routing decisions when routing service requests.

According to the method and system disclosed herein, a routing/management protocol is provided for enabling the federation of enterprise service buses in a dynamic and scalable manner. The protocol creates a distributed service registry and may synchronize relevant service metadata amongst ESB deployments as appropriate under defined business policies.

DETAILED DESCRIPTION OF THE INVENTION

The present invention relates to a protocol for enabling the federation of enterprise service buses in a dynamic and scalable manner. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The preferred embodiment provides a routing/management protocol for enabling the federation of enterprise service buses in a dynamic and scalable manner. The routing/management protocol enables creation of ESB federations having topologies that may align with business structures and that may automatically respond to changes in network and/or service conditions. The exemplary embodiment is based upon the concept of using the routing/management protocol and a distributed service registry to synchronize relevant service metadata amongst ESB deployments as appropriate under defined business policies.

Figure 1:
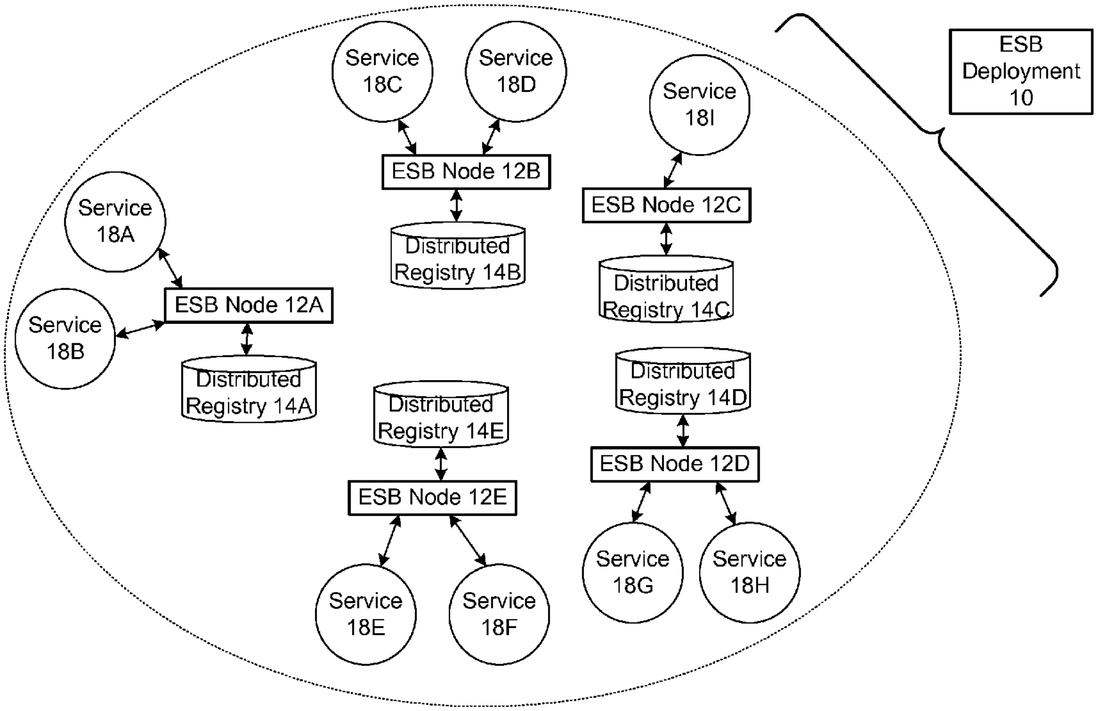
FIG. 1 is a logical block diagram illustrating an enterprise service bus deployment in accordance with an exemplary embodiment.

FIG. 1 is a logical block diagram illustrating a federation of enterprise service buses in accordance with an exemplary embodiment. An enterprise service bus (ESB) deployment 10 may include one or more ESB nodes 12A through 12E (collectively referred to as ESB nodes 12). The ESB nodes 12 are each individually responsible for providing virtualized connectivity to one or more instances of services 18A-18I (collectively referred to as services 18), including the routing of messages among the various services 18, such as service request messages. The ESB nodes 12 could be implemented as hardware or software-based ESB products, or XML/Web Services intermediaries. In this embodiment of the ESB deployment 10, all of the ESB nodes 12 may be treated as having the same local governance scope to collectively be one ESB deployment 10.

According to one aspect of the exemplary embodiment, a routing/management protocol is used by each of the ESB nodes 12 to allow the ESB nodes 12 to disseminate and share their routing and service state information with other ESB nodes 12. According to another aspect of the exemplary embodiment, each of the ESB nodes 12 may maintain its own respective distributed registry 14A through 14E (collectively referred to as a distributed service registry 14) to store the shared routing and service state information received from the other ESB nodes 12. The state information stored in each of the distributed registries 14 may include each ESB node's reachable neighbors and the services 18 run by each of those neighbors. Thus, the routing/management protocol and the distributed registry 14 of the exemplary embodiment can be used to enable dynamic and scalable federation of ESBs. As used herein a federation of ESBs may refer to an architecture where two or more ESB deployments 10 share routing state information, including routable service endpoints in the federation.

Figure 2:
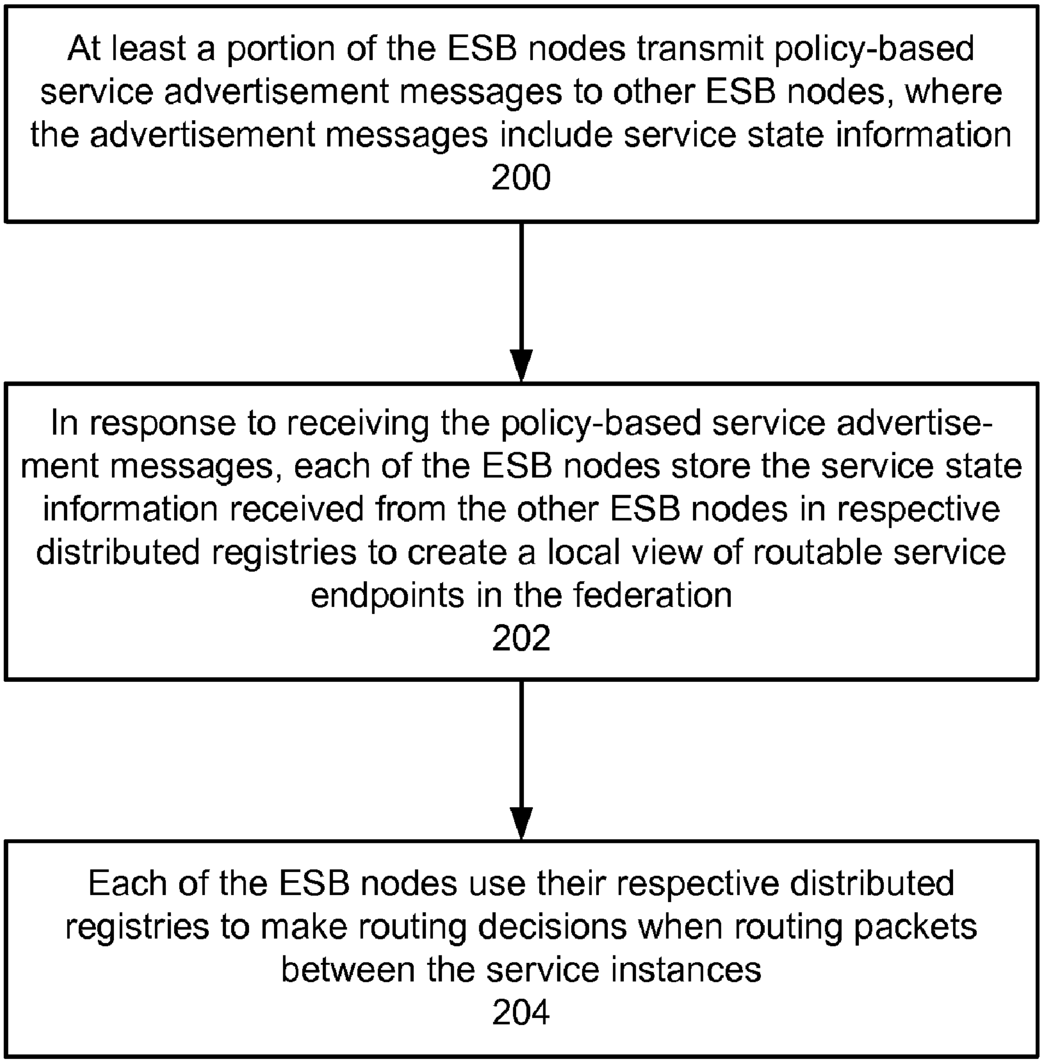
FIG. 2 is a flow diagram illustrating a process for creating a federation of ESBs using the protocol of the exemplary embodiment.

FIG. 2 is a flow diagram illustrating a process for creating a federation of ESBs using the routing/management protocol of the exemplary embodiment. The routing/management protocol allows ESB nodes 12 that are members of the federation to create a distributed service registry 14 as follows. At least a portion of the ESB nodes 12 transmit policy-based service advertisement messages to other ESB nodes 12, where the service advertisement messages include service state information (block 200). In response to receiving the state information from the other ESB nodes 12, each of the ESB nodes 12 stores the service state information received from the other ESB nodes 12 in the respective distributed registries 14A-14E to create a local view of routable service endpoints in the federation (block 202). In the exemplary embodiment, each ESB node 12 stores the state information of the other ESB nodes 12 in its corresponding distributed registry 14A-14E. Each of the ESB nodes 12 then use their respective distributed registry 14A-14E to make service message routing decisions when routing service requests between the service instances 18A-18I (block 204).

The advertisement messages sent from each of the ESB nodes 12 share the ESB node's service state data from each of the node's respective distributed service registry 14. According to the exemplary embodiment, the amount of service state data from the distributed service registry 14 that is shared with each ESB node 12 member of the federation is configurable via policy; which is referred to as policy-based service advertisement. Policy-based service advertisement allows different members of the federation to have different views of hosted services 18 at a particular ESB node 12 in the federation. In one embodiment, the policy-based service advertisement may be configured to define that certain services 18 are only exposed to certain ESB nodes 12 in the federation, and that the advertisement of particular services 18 are either allowed or disallowed. Thus, predetermined policy decisions determine how the ESB nodes 12 of one ESB deployment 10 are configured to send advertisement messages to other ESB deployments 10, and therefore determine the overall topology of the resultant ESB federation and the peer relationships of the ESB nodes 12 therein.

One result of ESB federation is that it may provide a logically centralized (at an appropriate scope) integration platform across different geographic and business boundaries, such that the topology formed by the federation of ESB deployments 10 may align directly to the structure of entities within an enterprise.

Figure 3:
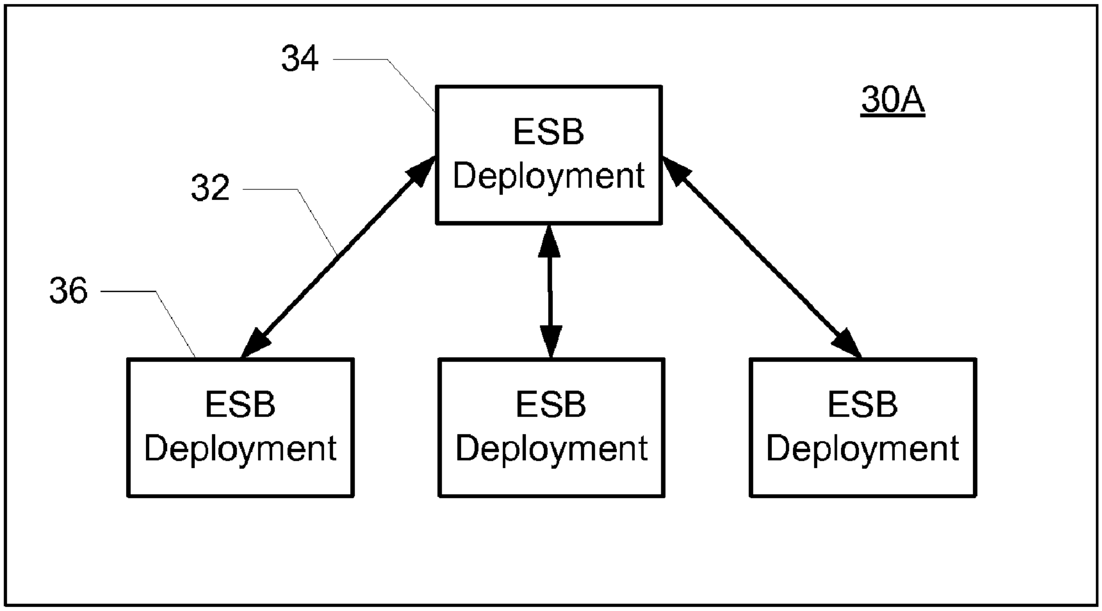
FIGS. 3 and 4 are diagrams showing example topologies for ESB federations that may align with common business structures.
Figure 4:
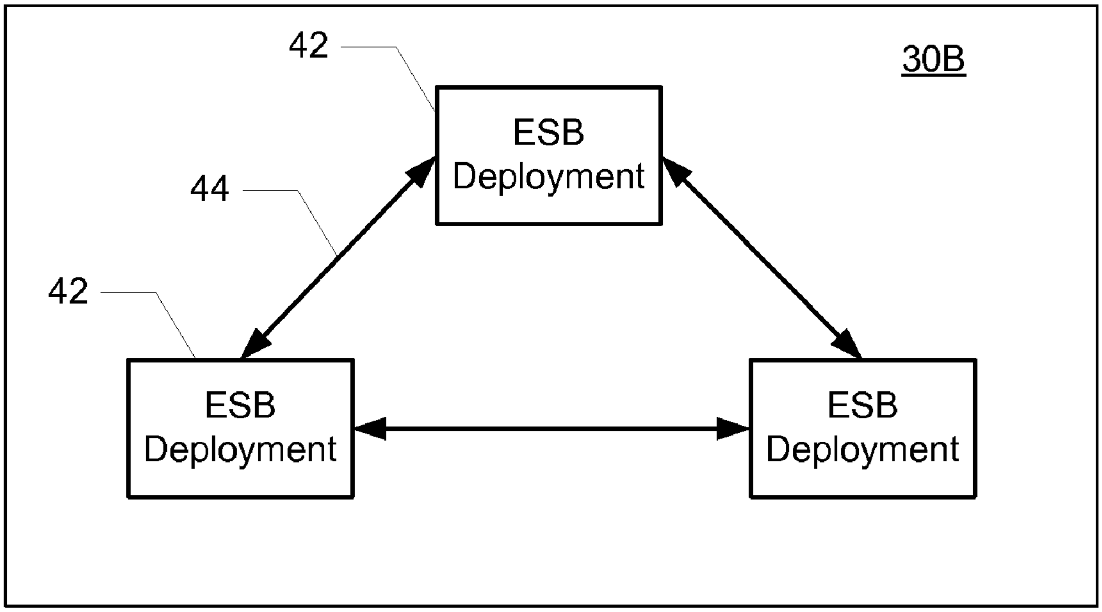

FIGS. 3 and 4 are diagrams showing example topologies for ESB federations 30A and 30B (collectively, ESB federation 30) that may align with common business structures. FIG. 3 shows the logical topology of a hub/spoke federated ESB 30A. In the hub/spoke federated ESB 30A, advertisement messages 32 are transmitted between a hub ESB deployment 34 and spoke ESB deployments 36. That is, some or all of the ESB nodes 12 in the spoke ESB deployment 36 may send advertisement messages 32 and service requests to some or all of the ESB nodes 12 contained in the hub ESB deployment 34, but not to the ESB nodes 12 contained in the other spoke ESB deployments 36. This type of topology may directly align with a Store/Branch business structure, and may force all service routing to be done through the hub ESB deployment 34.

FIG. 4 shows the logical topology of a directly-connected federated ESB 30B. In the directly-connected federated ESB 30B, all ESB deployments 42 transmit advertisement messages 44 directly to one another, so that service requests that are routed within the federation 30B pass directly from a source ESB deployment 42 to a destination ESB deployment 42. That is, some or all of the ESB nodes 12 in each of the ESB deployments 42 may transmit advertisement messages 44 and service requests to some or all of the ESB nodes 12 in all of the other ESB deployments 42. This type of topology directly aligns with the Multiple Geographies & Multiple Business Divisions business structures.

The exemplary embodiment may overcome manual configuration approaches to federating ESBs by utilizing a protocol to disseminate service data dynamically by allowing each ESB node 12 to distribute its local state information throughout the federation 30 through the use of advertisement messages, thus enabling a federated environment that is flexible to changes in service availability. In addition, the distributed service registry 14 may minimize scalability and reliability issues and enable the ESB nodes 12 to communicate together in order to provide a seamless policy-driven integration platform.

In one embodiment, the routing/management protocol may be implemented similar to an Open Shortest Path First routing protocol and may be built atop a Web Services Distributed Management (WSDM) framework. A reliable messaging infrastructure, such as WS-ReliableMessaging or WSRM could be utilized to ensure delivery of messages between federation ESB node 12 members. Also, a security mechanism, such as mutually authenticated SSL, could be used to ensure that communication only occurs between actual federation members.

According to the exemplary embodiment, the routing/management protocol may have a plurality of different advertisement message types to establish and maintain the ESB federation 30. For example, the routing/management protocol may be implemented with four main types of advertisement messages, including a Hello message, a Database Description message, a Service State Request message, and a Service State Update message.

The Hello message may be used to establish a connection between peer ESB nodes 12 in the federation 30. The Hello message may also provide a mechanism to detect if an ESB node 12 is currently reachable or not so that the distributed registry can be updated appropriately. The Database Description message may be used as an acknowledgement of the Hello message, and to share the sender's current view of the topology with the receiver. The Database Description message may also contain a set of all appropriate exportable service information between the ESB nodes 12. The Service State Request message may be sent to an ESB node 12 if a federation member needs information about a particular service 18. The Service State Update message may be sent as a response to the Service State Request message with relevant information about the requested service 18, or in a "push" model to send updates to service metadata to federation members.

In the text below and in FIGS. 5-7, examples are provided that describe example semantics of the protocol as well as example message formats, and how the protocol can be utilized to establish and maintain the distributed service registry. Once a system architect or some other type of administrator implements the policy-based service advertisement function that defines the federation topology, and after the peering relationships between the ESB deployments 10 (and their ESB nodes 12) are extracted from the ESB federation topology, the routing/management protocol can begin running at each federation member ESB node 12.

Figure 5:
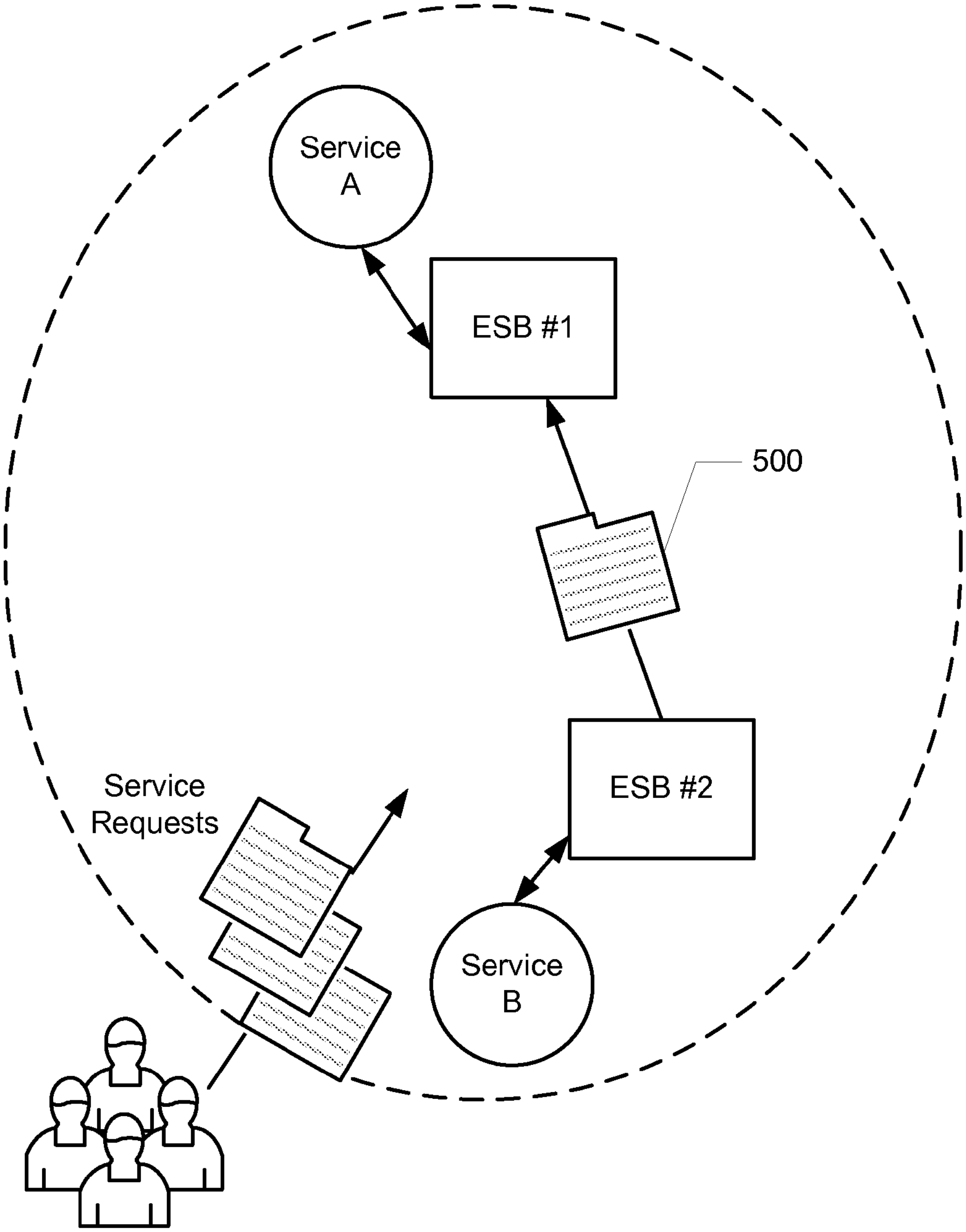
FIG. 5 is a block diagram illustrating the routing/management protocol when a new ESB node is added to the federation via a Hello message.

FIG. 5 is a block diagram illustrating the routing/management protocol when a new ESB node 12 is added to the federation via a Hello message 500. When an ESB node 12 joins the federation, it sends a Hello message to all other federation members to which it has a peering relationship according to the federation topology. In this particular example, a new ESB node (ESB#2) running a Service B has been added to an ESB federation that includes ESB#1 running Service A. When ESB#2 is added to the federation (and a peering relationship established with ESB#1), ESB#2 sends a Hello message 500 to ESB#1. The following is one example of the Hello message 500 implemented in XML:

```
<?xml version="1.0"?>
<Hello srcID="ESB2_ID">
    <esbInfo>
        <ipAddress>1.2.3.4</ipAddress>
        <mgmtPort>9876</mgmtPort>
    </esbInfo>
    <helloInterval>1000</helloInterval>
    <ESBsInFederation>
        <esb esbID="ESB2_ID"/>
    </ESBsInFederation>
</Hello>
```

Figure 6:
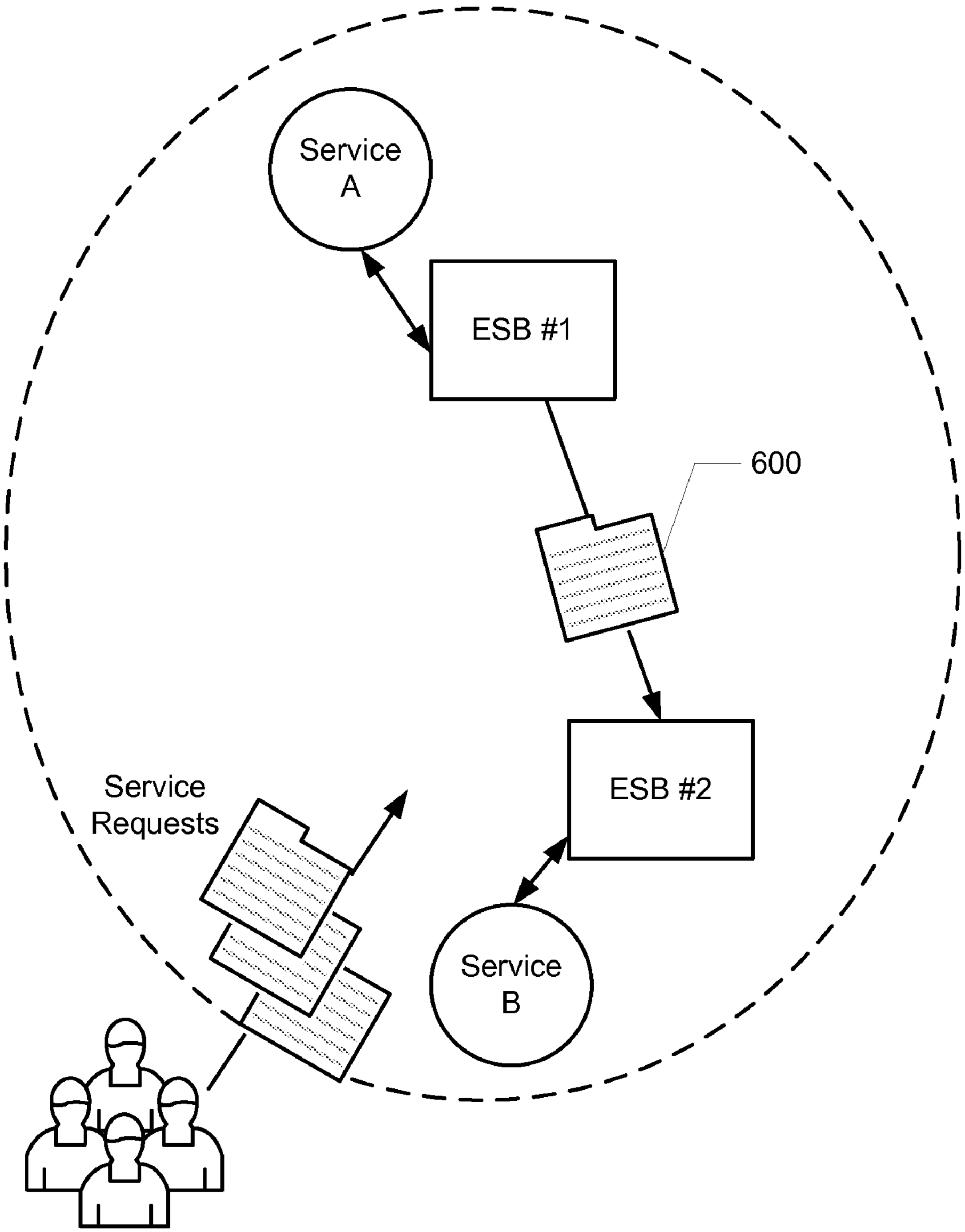
FIG. 6 is a block diagram illustrating the routing/management protocol during an initial exchange of database description messages between federation ESB nodes.

FIG. 6 is a block diagram illustrating the routing/management protocol during an initial exchange of database description messages 600 between federation ESB nodes. When an ESB node 12 receives a Hello message, it consults its policies to determine what subset of its service registry information it should share with the sender of the Hello message. Once it has made this decision, the receiving ESB node 12 responds to the joining member with a Database Description message. As shown in the example of FIG. 6, when ESB#1 receives the Hello message from ESB#2, ESB#1 responds by returning a Database Description message 600 to ESB#2 containing the appropriate service information, including the identification Service A. The following is one example of the Database Description message 600 implemented in XML:

```
<?xml version="1.0"?>
<DatabaseDescription srcID="ESB1_ID">
    <ESBsInFederation>
        <esb esbID="ESB1_ID"/>
        <esb esbID="ESB2_ID"/>
    </ESBsInFederation>
    <services>
        <service id="A" esb="ESB1_ID">
            <ipAddress>1.2.3.100</ipAddress>
            <port>80</port>
            <protocol type="SOAP/HTTP">
                <url>http://1.2.3.100:80/someService/a</url>
                <https>false</https>
            </protocol>
        </service>
    </services>
</DatabaseDescription>
```

Figure 7:
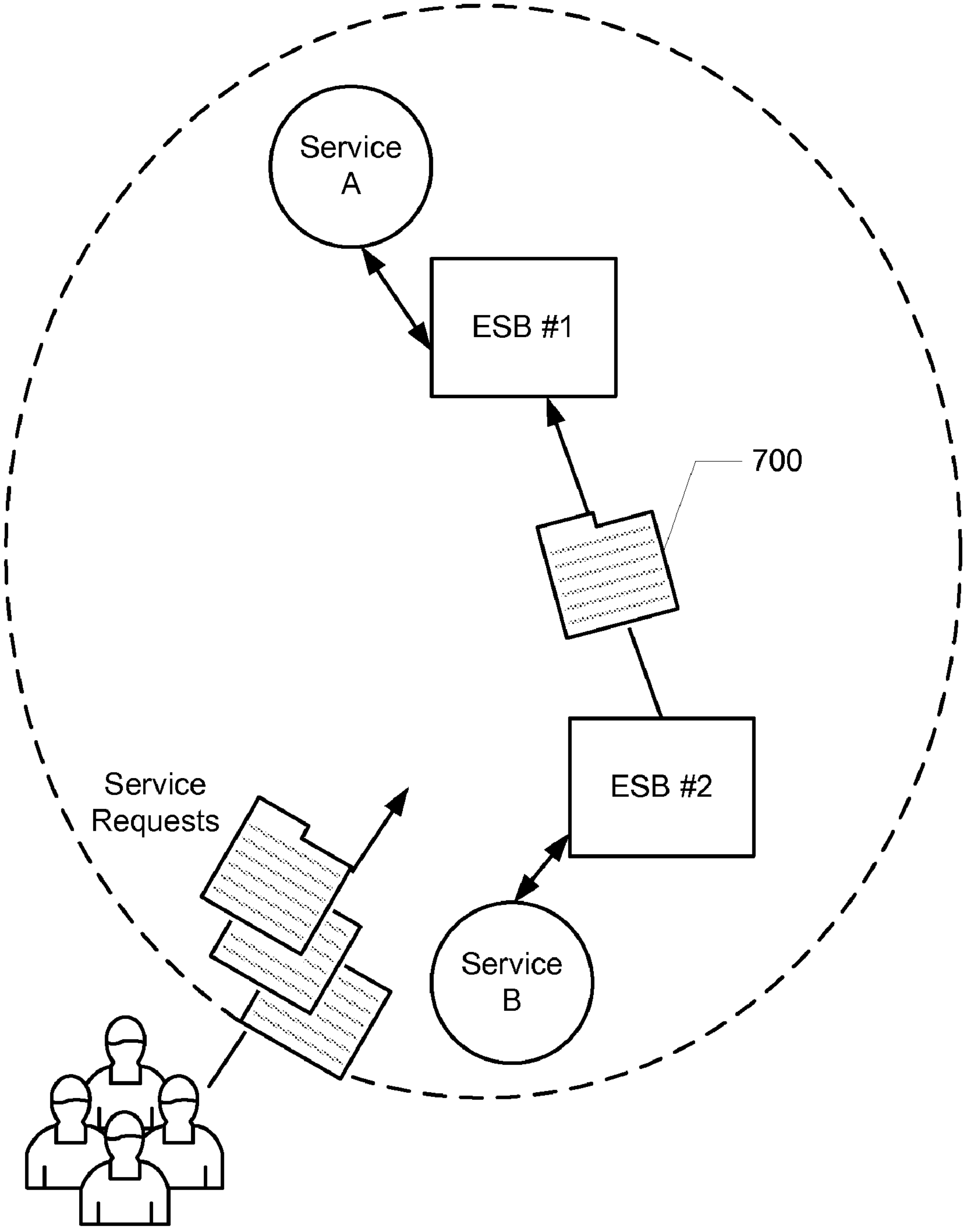
FIG. 7 is a block diagram illustrating an acknowledgement of a Database Description message between federation ESB nodes.

FIG. 7 is a block diagram illustrating an acknowledgement of a Database Description message between federation ESB nodes 12. After receiving the Database Description message 600 returned from ESB#1, the joining member, ESB#2, acknowledges the receipt of the Database Description message 600 by sending a Database Description message 700 that lists the shared services in the peering relationship, which would identify Service B. The following is one example acknowledgement of the Database Description message 700 implemented in XML:

```
<?xml version="1.0"?>
<DatabaseDescription srcID="ESB2_ID">
    <ESBsInFederation>
        <esb esbID="ESB1_ID"/>
        <esb esbID="ESB2_ID"/>
    </ESBsInFederation>
    <services>
        <service id="A" esbID="ESB1_ID">
            <ipAddress>1.2.3.100</ipAddress>
            <port>80</port>
            <protocol type="SOAP/HTTP">
                <url>http://1.2.3.100:80/someService/a</url>
                <https>false</https>
            </protocol>
        </service>
        <service id="B" esbID="ESB2_ID">
            <ipAddress>1.2.3.200</ipAddress>
            <port>900</port>
            <protocol type="SOAP/HTTP">
                <url >http://1.2.3.200:900/someService/b</url>
                <https>false</https>
            </protocol>
        </service>
    </services>
</DatabaseDescription>
```

Figure 8:
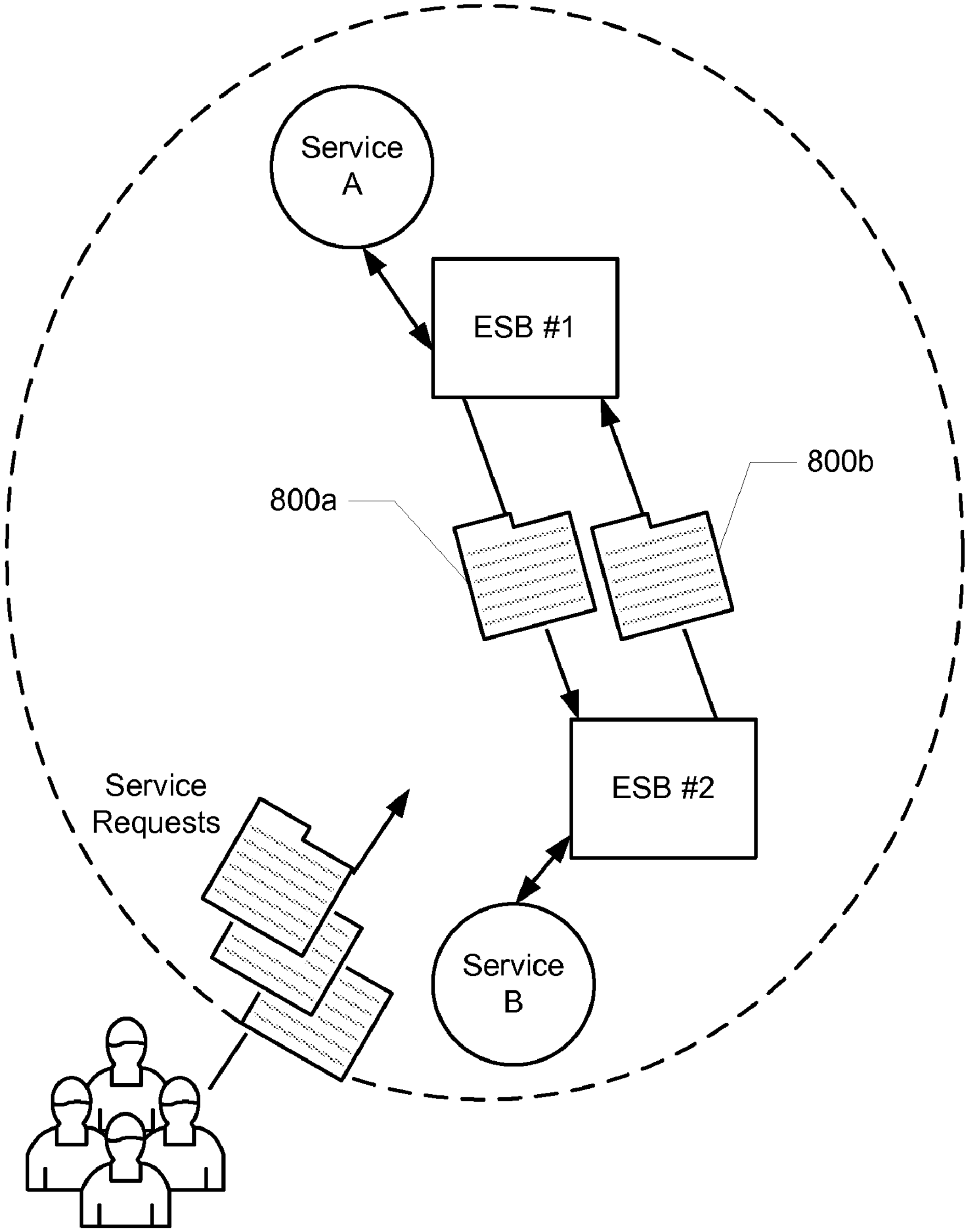
FIG. 8 is a block diagram illustrating an example of a Service State Update message being sent between peer ESB nodes to inform the ESB node that a port number is changing for a routable service proxy.

FIG. 8 is a block diagram illustrating an example of a Service State Update message being sent between peer ESB nodes 12 to inform the ESB node 12 that a port number is changing for a routable service proxy. In one embodiment, Hello messages may be periodically exchanged between federated ESB nodes 12 in a "heartbeat" fashion to ensure connectivity exists between federation members.

If a particular federation member ESB node, ESB#1 for example, needs information about a particular service (e.g. Service B), it may send a Service State Request message 800*a* to a peer, ESB#2 for example; and ESB#2 responds with a Service State Update message 800*b* with the requested information. The Service State Update message 800 provides an automated mechanism for the protocol to dynamically update the distributed registry amongst federation ESB node 12 members. This message type could be used to enable autonomic functionality like fast-failover and load balancing. In this case, the Service State Update messages 800 sent would cause the distributed service registry 14 to converge to a new state, causing a new endpoint to be chosen when a routing decision is made for a relevant service request. The following is one example Service State Update message 800 implemented in XML:

```
<?xml version="1.0"?>
<ServiceStateUpdate srcID="ESB2_ID" asdID="1">
    <services>
        <service id="A" esbNodeID="ESB1_ID">
            <ipAddress>1.2.3.100</ipAddress>
            <port>80</port>
            <protocol type="SOAP/HTTP">
                <url>http://1.2.3.100:80/someService/a</url>
                <https>false</https>
            </protocol>
        </service>
        <service id="B" esbNodeID="ESB2_ID">
            <ipAddress>1.2.3.200</ipAddress>
```

-continued

```
            <port>4205</port>
            <protocol type="SOAP/HTTP">
                <url>http://1.2.3.200:900/someService/b</url>
                <https>false</https>
            </protocol>
        </service>
    </services>
</ServiceStateUpdate>
```

The above show examples of how the routing/management protocol is used to create and synchronize the distributed service registry 14 within the ESB federation 30.

Figure 9:
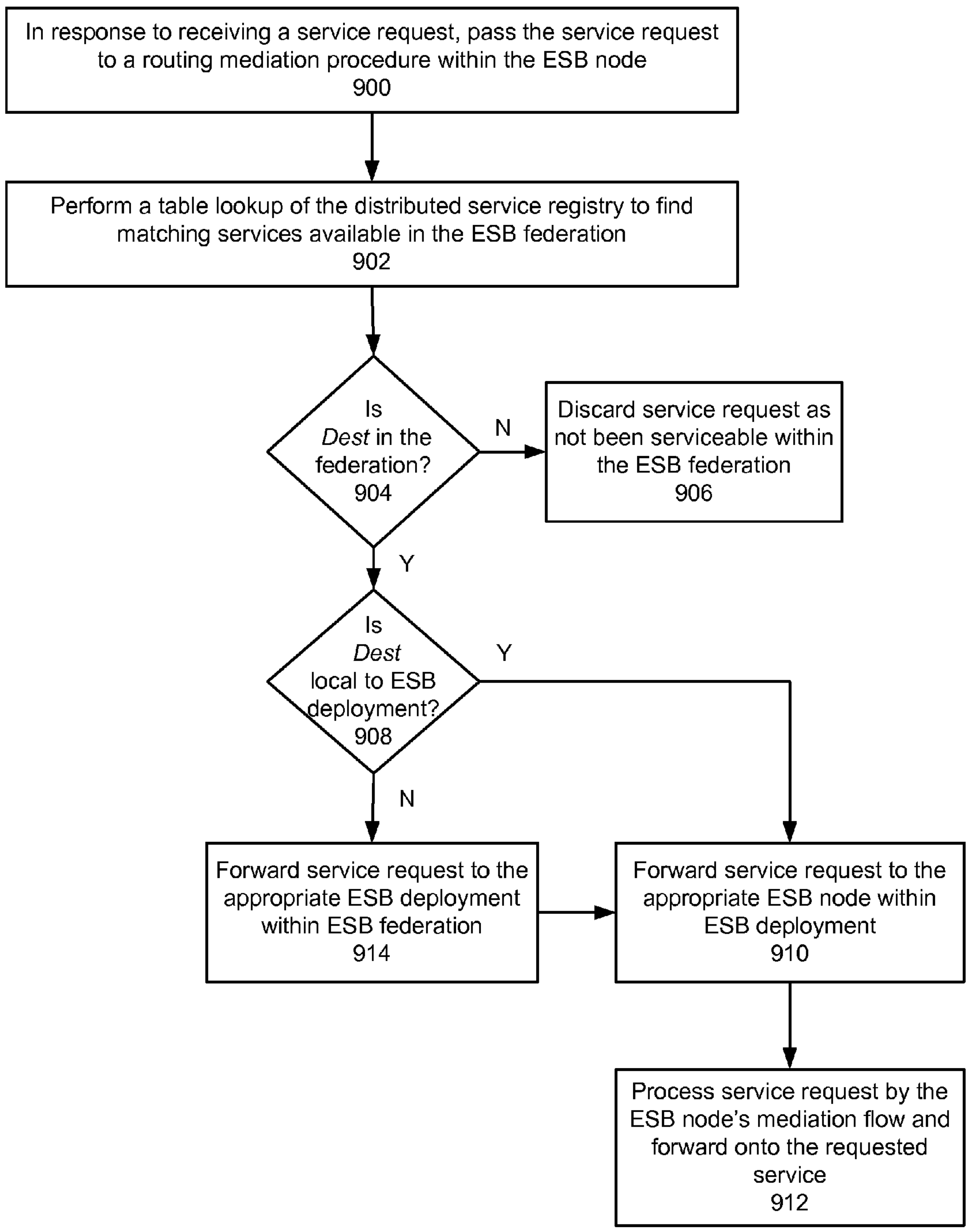
FIG. 9 is a flow diagram showing the process for using the distributed service registry to enable the routing/forwarding of service requests within the ESB federation.

FIG. 9 is a flow diagram showing the process for using the distributed service registry 14 to enable the routing/forwarding of service requests within the ESB federation 30. In response to one of the ESB nodes 12 in the ESB deployment 10 receiving a service request either directly from a service requester or forwarded from another ESB node 12, the service request is passed to a routing mediation procedure within the ESB node 12 (block 900). The routing mediation performs a table lookup of the distributed service registry 14 (which includes its own locally defined service connections) to find matching services 18 available in the entire ESB federation 30 and to determine a destination of where to send the service request (block 902).

It is then determined if the destination for the service request exist within the ESB federation 30 (block 904). If it is determined that a destination for the service request does not exist within the ESB federation 30, then the service request is discarded as not being serviceable within the federation 30 (block 906). Otherwise, it is determined if the destination for the service request exists that is local to the ESB deployment 10 such that there is an ESB node 12 reachable in the ESB deployment 10 appropriate for handling the service request (block 908). If so, then the service request is forwarded to the appropriate ESB node 12 within the ESB deployment 10 (block 910). The service request is then processed by the appropriate ESB node's mediation flow, and eventually forwarded onto the requested service 18 (block 912).

It is then determined if the destination for the service request exists within the ESB federation 30 (block 904). If it is determined that a destination for the service request does not exist within the ESB federation 30, then the service request is discarded as not being serviceable within the federation 30 (block 906). Otherwise, it is determined if the destination for the service request exists that is local to the ESB deployment 10 such that there is an ESB node 12 reachable in the ESB deployment 10 appropriate for handling the service request (block 908). If so, then the service request is forwarded to the appropriate ESB node 12 within the ESB deployment 10 (block 910). The service request is then processed by the appropriate ESB node's mediation flow, and eventually forwarded onto the requested service 18 (block 912).

In summary, the exemplary embodiments provide a routing/management protocol for enabling the federation of enterprise service buses in a dynamic and scalable manner that may enable the creation of ESB federations having topologies that align with business structures. The protocol is based upon the concept of creating a distributed service registry 14 and may synchronize relevant service metadata amongst ESB deployments 10 as appropriate under defined business policies.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A method and system for creating a federation of a plurality of enterprise service buses has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method for creating a federation of a plurality of enterprise service bus (ESB) nodes, each one of the ESB nodes providing connectivity to one or more services, the method comprising:

transmitting policy-based service advertisement messages from at least a portion of ESB nodes to other ESB nodes, wherein the policy-based service advertisement messages include service state information, wherein a policy on each of the transmitting ESB nodes controls which of the one or more services provided by that transmitting ESB node are advertised to which of the other ESB nodes, wherein the policy further controls that advertisement of the one or more services only be allowed to be exposed to certain ESB nodes in the federation and that advertisement of the one or more services be at least one of allowed or disallowed;

in response to receiving the policy-based service advertisement messages, storing by each of the ESB nodes, the service state information received from other ESB nodes in respective distributed registries to create a local view of routable service endpoints in the federation; and using by each of the ESB nodes, the respective distributed registries to make routing decisions when routing service requests.

2. The method of claim 1 wherein the service advertisement messages sent from each one of the ESB nodes share the ESB node's service state data from each of the ESB node's respective distributed registries.

3. The method of claim 2 wherein an amount of service state data from the respective distributed service registries that is shared with the ESB nodes of the federation is configurable via the policy on each of the transmitting ESB nodes, thereby providing policy-based service advertisement.

4. The method of claim 3 wherein the configuration of the policy-based service advertisement messages determines an overall topology of the ESB federation and peer relationships of the ESB nodes therein.

5. The method of claim 1 further comprising providing the policy-based service advertisement messages with a first message type that is used to at least one of establish a connection between the ESB nodes in the ESB federation and to detect if a particular one of the ESB nodes is currently reachable or not so that the distributed registries can be updated.

6. The method of claim 5 further comprising providing the policy-based service advertisement messages with a second message type that is used as an acknowledgement of the first message type, and to share a sender's current view of a topology of the ESB federation with a receiver.

7. The method of claim 6 further comprising providing the policy-based service advertisement messages with a third message type that is sent to a particular one of the ESB nodes if another one of the ESB nodes requests information about a particular one of the services.

8. The method of claim 7 further comprising providing the policy-based service advertisement messages with a fourth message type that is sent for at least one of as a response to the third message type with relevant information about the requested service, and to send updates to service metadata to the ESB nodes in the ESB federation.

9. An enterprise service bus federation system comprising:

a plurality of enterprise service bus (ESB) deployments, each of the ESB deployments comprising:

one or more ESB nodes, each providing connectivity to one or more services, including routing messages among the services; and a respective distributed registry maintained by each of the ESB nodes; and a protocol used by the ESB nodes, wherein according to the protocol, at least a portion of the ESB nodes function to:

transmit policy-based service advertisement messages to other ESB nodes, wherein the policy-based service advertisement messages include service state information, wherein a policy on each of the transmitting ESB nodes controls which of the one or more services provided by that transmitting ESB node are advertised to which of the other ESB nodes, wherein the policy further controls that advertisement of the one or more services only be allowed to be exposed to certain ESB nodes in the federation and that advertisement of the one or more services be at least one of allowed or disallowed;

in response to receiving the policy-based service advertisement messages, store the service state information received from other ESB nodes in the respective distributed registries to create a local view of routable service endpoints in the federation; and use the respective distributed registries to make message routing decisions when routing service requests.

10. The system of claim 9 wherein the service advertisement messages sent from each one of the ESB nodes share the ESB node's service state data from each of the ESB node's respective distributed registries.

11. The system of claim 10 wherein an amount of service state data from the respective distributed service registries that is shared with each ESB node of the federation is configurable via the policy on each of the transmitting ESB nodes, thereby providing policy-based service advertisement.

12. The system of claim 11 wherein the configuration of the policy-based service advertisement messages determines an overall topology of the ESB federation and peer relationships of the ESB nodes therein.

13. The system of claim 9 wherein the policy-based service advertisement messages include a first message type that is used to at least one of establish a connection between the ESB nodes in the ESB federation and to detect if a particular one of the ESB nodes is currently reachable or not so that the distributed registries can be updated.

14. The system of claim 13 wherein the policy-based service advertisement messages include a second message type that is used as an acknowledgement of the first message type, and to share a sender's current view of a topology of the ESB federation with a receiver.

15. The system of claim 14 wherein the policy-based service advertisement messages include a third message type that is sent to a particular one of the ESB nodes if another one of the ESB nodes requests information about a particular one of the services.

16. The system of claim 15 wherein the policy-based service advertisement messages include a fourth message type that is sent for at least one of as a response to the third message type with relevant information about the requested service, and to send updates to service metadata to the ESB nodes in the ESB federation.

17. A method for using a distributed service registry for routing and forwarding service requests within an enterprise service bus (ESB) federation comprising at least two ESB deployments, wherein each of the ESB deployments further comprise one or more ESB nodes, the method comprising:

in response to a first ESB node in a first ESB deployment receiving a service request, passing the service request to a routing mediation procedure within the first ESB node;

performing by the routing mediation a table lookup of a distributed service registry to find matching services available in the first ESB federation and to determine a destination of where to send the service request, wherein the distributed service registry stores policy-based service advertisement messages from remote ESB nodes, wherein the policy-based service advertisement messages include service state information, wherein a policy on each remote ESB node has controlled which of one or more services on that remote ESB node were advertised to the first ESB node, wherein the policy has further controlled that advertisement of the one or more services only be allowed to be exposed to certain ESB nodes in the federation and that advertisement of the one or more services be at least one of allowed or disallowed;

determining by the routing mediation whether the destination for the service request exists within the ESB federation;

if it is determined that a destination for the service request does not exist within the ESB federation, then discarding the service request as not being serviceable within the federation;

determining by the routing mediation if the destination for the service request exists that is local to the first ESB deployment such that there is a second ESB node reachable in the first ESB deployment appropriate for handling the service request;

if the routing mediation determines that the destination for the service request is local to the first ESB deployment, then forwarding the service request to the second ESB node within the first ESB deployment, processing the service request by the second ESB node, and forwarding the service request onto the requested service; and if the routing mediation determines that the destination for the service request exists in the ESB federation, but that the destination is not local to the first ESB deployment, then forwarding the service request to a second ESB deployment, and then forwarding the service request onto an appropriate ESB node that provides connectivity for the particular service being requested.

18. An executable software product stored on a non-transitory computer-readable medium containing program instructions for creating a federation of a plurality of enterprise service buses (ESB) nodes, each one of the ESB nodes providing connectivity to one or more services, the program instructions for:

transmitting policy-based service advertisement messages from at least a portion of ESB nodes to other ESB nodes, wherein the policy-based service advertisement messages include service state information, wherein a policy on each of the transmitting ESB nodes controls which of the one or more services provided by that transmitting ESB node are advertised to which of the other ESB nodes, wherein the policy further controls that advertisement of the one or more services only be allowed to be exposed to certain ESB nodes in the federation and that advertisement of the one or more services be at least one of allowed or disallowed;

in response to receiving the policy-based service advertisement messages, storing by each of the ESB nodes, the service state information received from other ESB nodes in respective distributed registries to create a local view of routable service endpoints in the federation; and using by each of the ESB nodes, the respective distributed registries to make routing decisions when routing messages.

* * * * *